US010837793B2

(12) United States Patent
Roy Chowdhury et al.

(10) Patent No.: US 10,837,793 B2
(45) Date of Patent: Nov. 17, 2020

(54) SYSTEM AND METHOD FOR UTILIZING AGGREGATED WEATHER DATA FOR ROAD SURFACE CONDITION AND ROAD FRICTION ESTIMATES (71) Applicant: Volvo Car Corporation, Gothenburg (SE)

(72) Inventors: Sohini Roy Chowdhury, Mountain View, CA (US); Srikar Muppirisetty, Gothenburg (SE); Niklas Ohlsson, Gothenburg (SE); Minming Zhao, Mountain View, CA (US); Mats Jonasson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 234 days.

(21) Appl. No.: 16/006,241

(22) Filed: Jun. 12, 2018

(65) Prior Publication Data
US 2019/0376811 A1    Dec. 12, 2019

(51) Int. Cl.
G01C 21/36    (2006.01)
B60Q 9/00    (2006.01)
(Continued)

(52) U.S. Cl.
CPC .......... *G01C 21/3694* (2013.01); *B60Q 9/00* (2013.01); *B60W 40/068* (2013.01);
(Continued)

(58) Field of Classification Search
CPC ... G01C 21/3694; B60Q 9/00; B60W 40/068; B60W 50/14; B60W 2552/40;
(Continued)

(56) References Cited

U.S. PATENT DOCUMENTS

2005/0010350 A1* 1/2005 Hiwatashi ........ G08G 1/096758
701/80
2011/0112747 A1* 5/2011 Downs ................. G08G 1/0104
701/118
(Continued)

FOREIGN PATENT DOCUMENTS

DE        10126459 C1      1/2003
DE     2015201383 A1      7/2016
DE     2015007493 C1     12/2016

OTHER PUBLICATIONS

Oct. 16, 2019 Extended European Search Report issued on International Application No. 19179384.
(Continued)

*Primary Examiner* — Thomas Ingram
(74) *Attorney, Agent, or Firm* — Clements Bernard Walker; Christopher L. Bernard (57) ABSTRACT A system and method for utilizing aggregated weather data (AWD) for deriving road surface condition (RSC) estimates. This system and method supplements road friction estimates (RFEs) made at the vehicle level with AWD in the cloud to form the RSC estimates, which are then transmitted to the vehicles such that more accurate RFEs can be made locally, and so on. Conventional RFE physics-based models are replaced with enhanced RFE trained machine learning (ML) models accordingly. Global RSC estimates are derived for each geographical region using weather and location constraints. Thus, improved autonomous driving and driver assist functions may be implemented, better driver warnings may be provided, and safer road trips may be planned in advance based on a thorough analysis of the drivable conditions.

22 Claims, 4 Drawing Sheets (51) Int. Cl.
*B60W 40/068* (2012.01)
*B60W 50/14* (2020.01)
*G08G 1/0967* (2006.01)

(52) U.S. Cl.
CPC ........... *B60W 50/14* (2013.01); *G08G 1/0967* (2013.01); *B60W 2552/40* (2020.02); *B60W 2555/20* (2020.02)

(58) Field of Classification Search
CPC ......... B60W 2555/20; B60W 2556/50; B60W 50/0097; B60W 50/0098; B60W 2050/0002; B60W 2050/0078; B60W 2050/0077; B60W 40/06; G08G 1/0967
See application file for complete search history.

(56) References Cited

U.S. PATENT DOCUMENTS

| | | | |
|---|---|---|---|
| 2011/0173015 A1* | 7/2011 | Chapman | G01C 21/3691 705/1.1 |
| 2014/0062725 A1* | 3/2014 | Maston | G08G 1/0112 340/905 |
| 2014/0222321 A1* | 8/2014 | Petty | G01C 21/3492 701/117 |
| 2015/0166072 A1* | 6/2015 | Powers | G01C 21/3602 701/1 |
| 2016/0264130 A1* | 9/2016 | Klier | B60W 30/02 |
| 2017/0023945 A1* | 1/2017 | Cavalcanti | G08G 1/04 |
| 2018/0114064 A1 | 4/2018 | Schnittman | |

OTHER PUBLICATIONS

Sirvio, Konsta, and Jaakko Hollmen. "Spatio-temporal road condition forecasting with markov chains and artificial neural networks." International Workshop on Hybrid Artificial Intelligence Systems. Springer, Berlin Heidelberg, 2008.

Berrocal, Veronica J., et al.,"Probabilistic weather forecasting for winter road maintenance." Journal of the American Statistical Association 105.490 (2010): 522-537.

Kangas, Markku, et al. "The FMI road weather model." HIRLAM Newsletter 51 (2006): 117-123.

Hermans,Elke, et al. "The impact of weather conditions on road safety investigated on an hourly basis." Transportation Research Board, 2006.

Jian-Hua, Yuan, et al. "A method to design weather-responsive speed limit subject to visible distance in the absence of road surface friction coefficient." Intelligent Computation Technology and Automation(ICICTA), 2015, 8th International conference on. IEEE, 2015.

Sass, Bent H. "A numerical forecasting system for the prediction of slippery roads." Journal of Applied Meteorology36.6 (1997): 801-817.

* cited by examiner

SYSTEM AND METHOD FOR UTILIZING AGGREGATED WEATHER DATA FOR ROAD SURFACE CONDITION AND ROAD FRICTION ESTIMATES

FIELD OF THE DISCLOSURE

The present disclosure relates generally to the active safety field. More specifically, the present disclosure relates to a system and method for utilizing aggregated weather data (AWD) for evaluating road surface condition (RSC) road friction estimates (RFEs). This system and method supplements existing RFEs made by physics-based and machine learning (ML) strategies that are made at the vehicle level with AWD in the cloud to improve the RSC estimates, which can be transmitted to the vehicles such that more accurate RFEs can be made locally, and so on. Conventional RFE physics-based models with low availability can be replaced with enhanced versions, such as trained ML models for the detection and prediction of RFEs accordingly. Global RSC estimates can then be derived for each geographical region using weather and location constraints. Thus, improved autonomous driving and driver assist functions may be more effectively implemented, better driver warnings may be provided, and safer road trips may be planned in advance based on a thorough analysis of the drivable conditions.

BACKGROUND OF THE DISCLOSURE

Conventionally, fleets of vehicles may report slippery road conditions to the cloud to alert one another to potentially hazardous road conditions. In general, RFEs are detected in real time using on-board vehicle sensors or the like that detect wheel slippage as it happens. Such measurements are often undesirably inaccurate and suffer from relatively low RFE availability. Thus, cloud reporting methodologies also suffer from these shortcomings. The preemptive estimation of road friction can enhance vehicle safety and significantly reduce road surface-related accidents, damage, and injuries. While road slipperiness and friction are dependent upon weather conditions, there is currently a lack of effective communication between vehicles to optimally utilize AWD for RSC and RFE estimation. Thus, advanced autonomous driving and driver assist functions may not yet be implemented, better driver warnings may not yet be provided, and safer road trips may not yet be planned in advance based on a thorough analysis of the drivable conditions. The present disclosure addresses these problems.

Prior work has focused on clustering road segments based on similarity measures and implementing Markov models to estimate or predict road roughness and road rutting state for each road segment, with a transition matrix from one road state to another being learned from historical data. Weather-related features used to quantify road similarity have included average ambient, ground, and road temperatures, average maximum wind speed, average wind direction, rainfall sums, and freezing temperature percentages. However, no workable architecture has been provided to utilize the resulting information. Similarly, ice formation for road segments has been predicted using joint predictive probability distributions for temperature and precipitation, presenting statistical correlations between latitude, longitude, elevation, wind speed, temperature, and precipitation for neighboring regions. A thorough analysis of drivable conditions is not yet available. Thus, advanced autonomous driving and driver assist functions may not yet be implemented, better driver warnings may not yet be provided, and safer road trips may not yet be planned in advance. The present disclosure addresses these problems.

BRIEF SUMMARY OF THE DISCLOSURE

In various exemplary embodiments, the present disclosure provides a system and method for utilizing AWD for deriving road surface condition RSC estimates. This system and method supplements RFEs made at the vehicle level with AWD in the cloud to form the RSC estimates, which are then transmitted to the vehicles such that more accurate RFEs can be made locally, and so on. Conventional RFE physics-based models are replaced with enhanced RFE trained ML models accordingly. Global RSC estimates are derived for each geographical region using weather and location constraints. Thus, improved autonomous driving and driver assist functions may be implemented, better driver warnings may be provided, and safer road trips may be planned in advance based on a thorough analysis of the drivable conditions.

The present disclosure provides a strategy for effectively combining AWD with the RFEs from individual vehicles. ML algorithms indicate that road surface type is a significant factor for RFE determination. Thus, RSC is computed in the cloud for specific locations and this information is probed by individual vehicles to increase the accuracy and availability of the associated RFE determinations, utilizing optimal communication strategies. Thus, the present disclosure goes beyond RSC estimation for specific locations using statistical models, presenting a novel framework for combining RSC estimates and RFEs for the in-vehicle assessment of drivable conditions.

Further, global positioning system (GPS) data and statistics are utilized in the cloud to predict RSC over time. Weather stations today merely estimate and predict the state of the sky. There is no existing apparatus to derive global RSC estimates for each geographical region using only weather and location constraints. However, the correlation between GPS coordinates, weather, and altitude can be used to estimate RSC and road friction, followed by the application of Markov models or the like to model the variation of a road surface over time. Additionally, road work vehicle schedules can be used to further enhance RSC estimation accuracy. Effectively, relevant ground and sky considerations are combined. This methodology enables the tagging of geographical regions with estimates and predictions for RSC and road slipperiness. Thus, drivers can select optimal routes in advance, not based only on distance and time, but also based on road safety indices.

In one exemplary embodiment, the present invention provides a system for utilizing aggregated weather data (AWD) for deriving a road surface condition (RSC) estimate and a road friction estimate (RFE), including: a cloud subsystem operable for determining the RSC estimate for a geographical location using the AWD; and a vehicle subsystem in communication with the cloud subsystem operable for receiving the determined RSC estimate for the geographical location, combining the determined RSC estimate for the geographical location with one or more of local sensor data and local camera data in a trained machine learning (ML) model, and determining the RFE based on the determined RSC estimate for the geographical location and the one or more of the local sensor data and the local camera data. As used here, local sensor and camera data also contemplates local sound data, ultrasound data, lidar data, etc. The system further includes a communication link operable for transmitting the determined RFE to the cloud subsystem to revise the determined RSC estimate for the geographical location to form a revised determined RSC estimate for the geographical location. The determined RSC estimate for the geographical location is transmitted from the cloud subsystem to any vehicle subsystem actually or potentially passing through the geographical location such that a corresponding RFE based on the determined RSC estimate for the geographical location and one or more of corresponding local sensor data and corresponding local camera data can be determined using a corresponding trained ML model. The cloud subsystem is further operable for generating a training data set using the aggregated weather data that is transmitted to and used to train the trained ML model in the vehicle subsystem. The cloud subsystem is further operable for evaluating global RSC estimates for each geographical region using weather, weather forecast, and location constraints. The cloud subsystem is operable for updating the RSC estimate by formulating a measured vector of states corresponding to road condition for each geographical location, applying a transition probability matrix (or other statistical covariance tool) to the vector of states, and generating a predicted vector of states corresponding to road condition for each geographical location. The cloud subsystem is operable for tagging each geographical location with a predicted RSC estimate and transmitting a corresponding road condition indicator associated with each tagged geographical location along a route of interest to one or more of the vehicle subsystem and a mobile application. The one or more of the vehicle subsystem and the mobile application are operable for displaying the road condition indicator associated with each tagged geographical location along the route of interest to a user for route planning purposes. The vehicle subsystem includes a vehicle control system operable for one or more of directing and modifying operation of the vehicle subsystem based on the determined RFE. The vehicle subsystem further includes a vehicle control system operable for delivering a corresponding alert to a driver based on the determined RFE.

In another exemplary embodiment, the present invention provides a method for utilizing aggregated weather data (AWD) for deriving a road surface condition (RSC) estimate and a road friction estimate (RFE), including: in a cloud subsystem, determining the RSC estimate for a geographical location using the AWD; and, in a vehicle subsystem in communication with the cloud subsystem, receiving the determined RSC estimate for the geographical location, combining the determined RSC estimate for the geographical location with one or more of local sensor data and local camera data in a trained machine learning (ML) model, and determining the RFE based on the determined RSC estimate for the geographical location and the one or more of the local sensor data and the local camera data. As used here, local sensor and camera data also contemplates local sound data, ultrasound data, lidar data, etc. The method further includes, via a communication link, transmitting the determined RFE to the cloud subsystem to revise the determined RSC estimate for the geographical location to form a revised determined RSC estimate for the geographical location. The determined RSC estimate for the geographical location is transmitted from the cloud subsystem to any vehicle subsystem actually or potentially passing through the geographical location such that a corresponding RFE based on the determined RSC estimate for the geographical location and one or more of corresponding local sensor data and corresponding local camera data can be determined using a corresponding trained ML model. The method further includes, in the cloud subsystem, generating a training data set using the aggregated weather data that is transmitted to and used to train the trained ML model in the vehicle subsystem. The method further includes, in the cloud subsystem, evaluating global RSC estimates for each geographical region using weather, weather forecast, and location constraints. The method further includes, in the cloud subsystem, updating the RSC estimate by formulating a measured vector of states corresponding to road condition for each geographical location, applying a transition probability matrix (or other statistical covariance tool) to the vector of states, and generating a predicted vector of states corresponding to road condition for each geographical location. The method further includes, in the cloud subsystem, tagging each geographical location with a predicted RSC estimate and transmitting a corresponding road condition indicator associated with each tagged geographical location along a route of interest to one or more of the vehicle subsystem and a mobile application. The method further includes, via one or more of the vehicle subsystem and the mobile application, displaying the road condition indicator associated with each tagged geographical location along the route of interest to a user for route planning purposes. The vehicle subsystem includes a vehicle control system operable for one or more of directing and modifying operation of the vehicle subsystem based on the determined RFE. The vehicle subsystem further includes a vehicle control system operable for delivering a corresponding alert to a driver based on the determined RFE.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
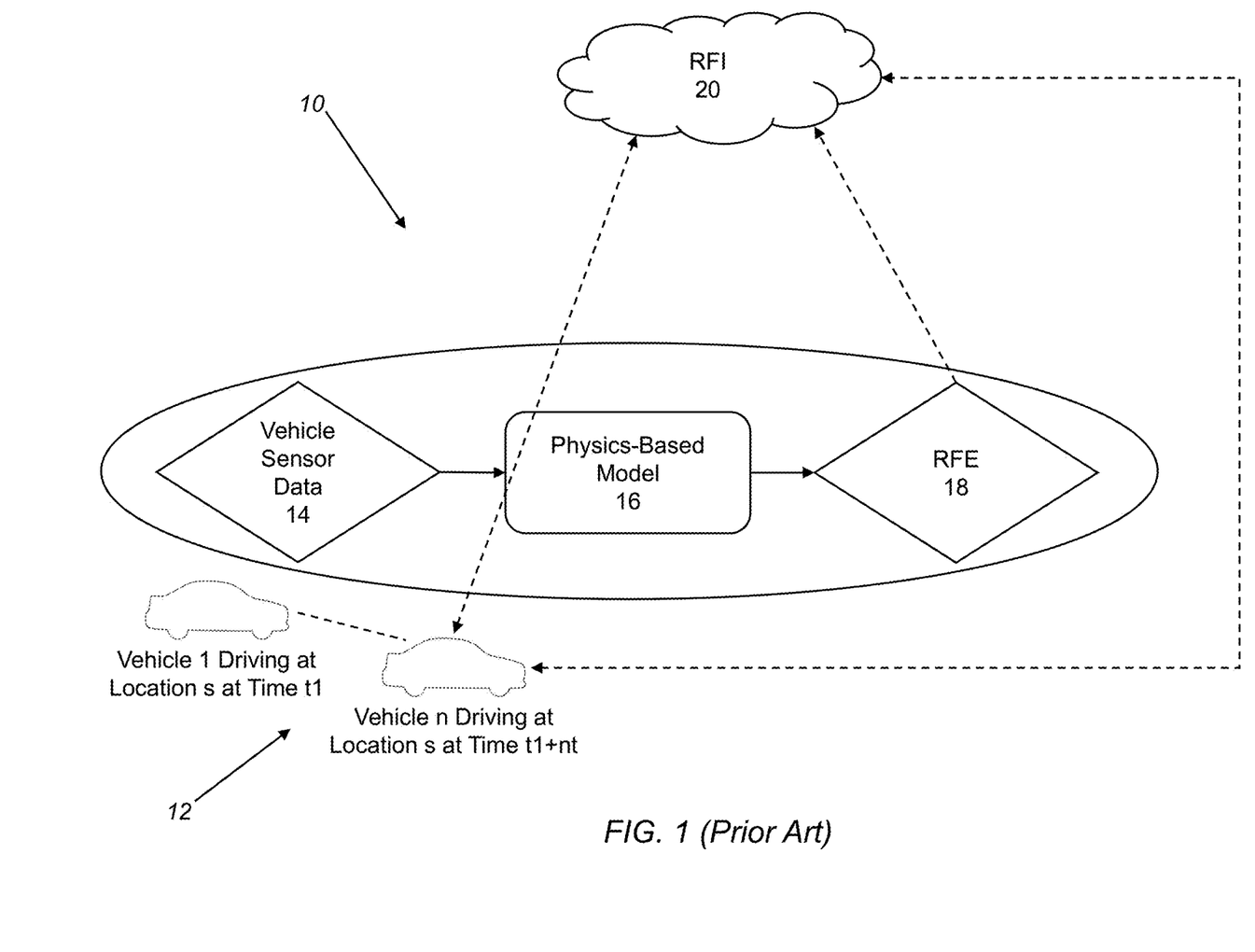
FIG. 1 is a schematic diagram illustrating a conventional system and method for RFE determination on a vehicle level using a sensor/camera data and a physics-based model, with the resulting RFE communicated to the cloud and dispersed to other vehicles passing through the same location at a later time.

Referring now specifically to FIG. 1, in a conventional system for the vehicle-to-vehicle communication of a RFE using cloud-based road condition information (RFI) 10, each vehicle 12 driving at a given location at a given time includes a sensor suite 14 that generates data related to a low-friction wheel slippage event. This sensor data is fed into an on-board physics-based model 16 or the like that formulates a corresponding RFE 18. This type of physics-based model 16 is well known to those of ordinary skill in the art. The RFE is a relative estimate of friction between the vehicle tires and the drivable surface, with a value in the range [0,1], with a low value indicating a slippery surface and a high value indicating favorable drivable conditions. As alluded to above, such an RFE is prone to inaccuracy and inherently suffers from low availability. Research has shown that supplementing the sensor data with RSC data (e.g., dry, wet, water, snow, ice, and other drivable condition information) yields a more accurate RFE than without the RSC data. This is a focus of the present disclosure. Each RFE is fed into the cloud to form a database of RFI 20. This RFI 20 is then transmitted to each vehicle driving at the same location at a later time to promote safety.

Figure 2:
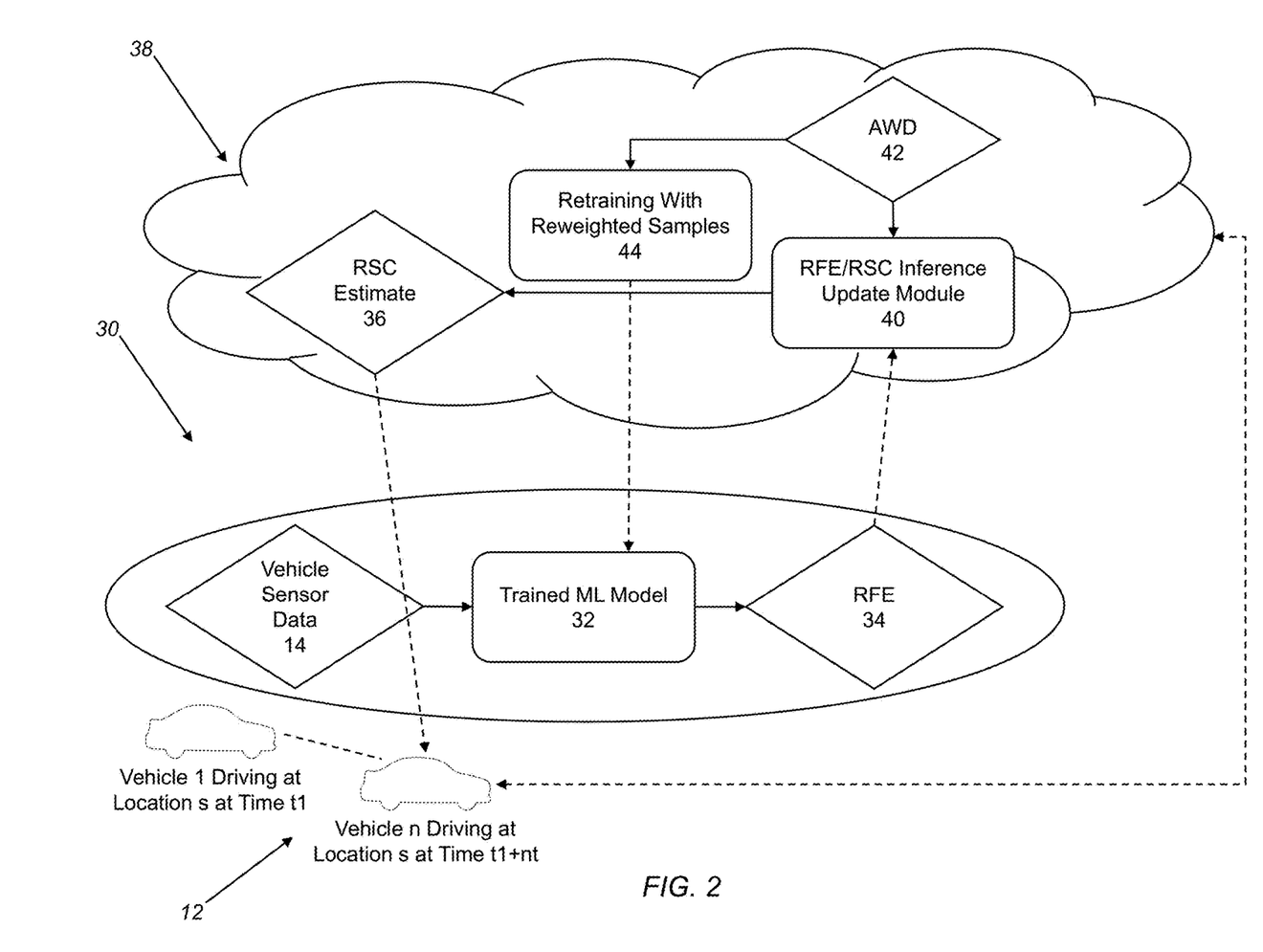
FIG. 2 is a schematic diagram illustrating one exemplary embodiment of the system and method for RFE determination of the present disclosure, taking advantage of cloud-based RSC estimation incorporating AWD, with the RFE determination utilizing a ML model.

Referring now specifically to FIG. 2, in one exemplary embodiment of the system for RFE determination of the present disclosure 30, each vehicle 12 driving at a given location at a given time again includes a sensor suite 14 that generates data related to a low-friction wheel slippage event. However, this sensor data is fed into an on-board trained ML model 32 or the like that formulates an enhanced RFE 34, as is described in greater detail herein below. This type of trained ML model 32 is a supervised classification model that reads the sensor data, as well as RSC data 36, to predict the RFE 34 for the vehicle for each geo-spatial location. In an iterative or closed-loop manner, the RFE 34 is uploaded to the cloud 38, and specifically to a RFE/RSC inference update module 40 that updates the RSC estimate 36 by combining it with AWD 42. Essentially, this determines RSC in patches. For every geo-spatial location "s", the aggregated weather includes ambient temperature, precipitation index, humidity, wind speed, and like details from neighboring locations, including forecasts. The aggregated weather is collected by a weather service provider, for example. In addition, the AWD 42 is fed into a retraining module 44 that updates training samples (with reweighted training samples) used to train the in-vehicle trained ML model 32, that is then used to formulate the RFE 34, and so on. The output of the RFE/RSC inference update module 40 is the RSC estimate 36, which is fed into the trained ML model 32, along with the sensor data, to formulate the RFE 34. The RSC estimate 36, for every geo-spatial location "s", refers to the drivable surface condition (e.g., dry, wet, water, snow, or ice) along with information related to ice formation, road roughness state, road rutting state, etc. This RSC estimate 36 changes with time of day and season, and can be inferred from GPS coordinates, latitude, longitude, elevation, and wind from neighboring locations.

Figure 3:
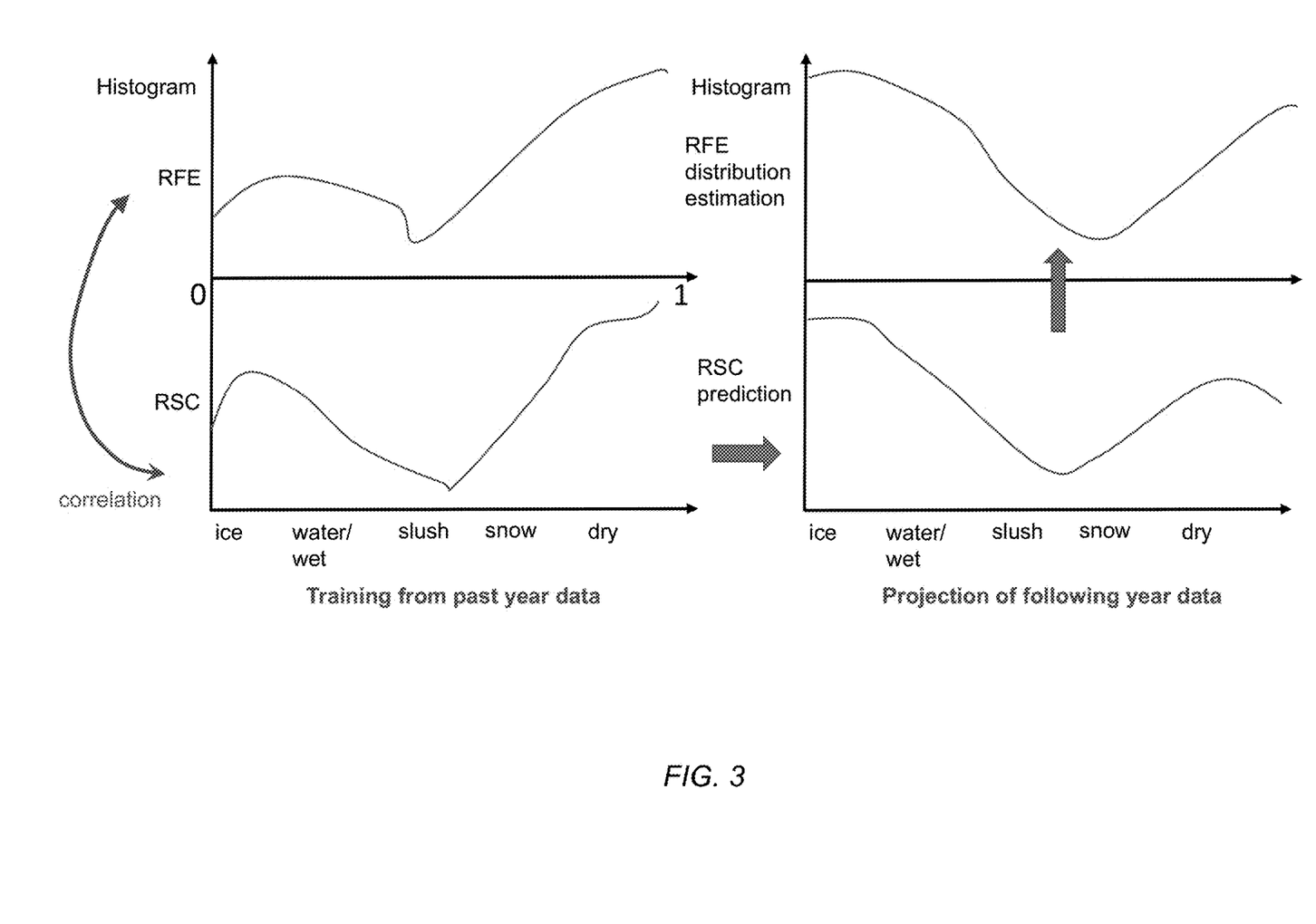
FIG. 3 is a series of plots illustrating a framework for fine-tuning the trained ML model for RFE determination for each vehicle.

Related to the retraining module 44, FIG. 3 illustrates a framework for fine-tuning the trained ML model 32 for RFE determination for each vehicle. For a given year, the histogram of RFE and RSC can be plotted and the correlations in the sample weightages can be analyzed. For the following year, the RFE distribution can be inferred from the RSC predictions from the aggregated weather. Training samples for vehicle RFE estimation can then be re-weighted based on the estimated RFE distribution. For example, if there was little snow and sunny days last year, then the RSC and RFE distributions of data samples will look like the left column (large numbers for RFE and dry sample conditions). However, if the next year the weather predictions show higher snow and more windy days (leading to more icy conditions), then the RFE training samples for the trained ML model 32 must be re-trained with the re-weighted samples for accurate predictions.

Figure 4:
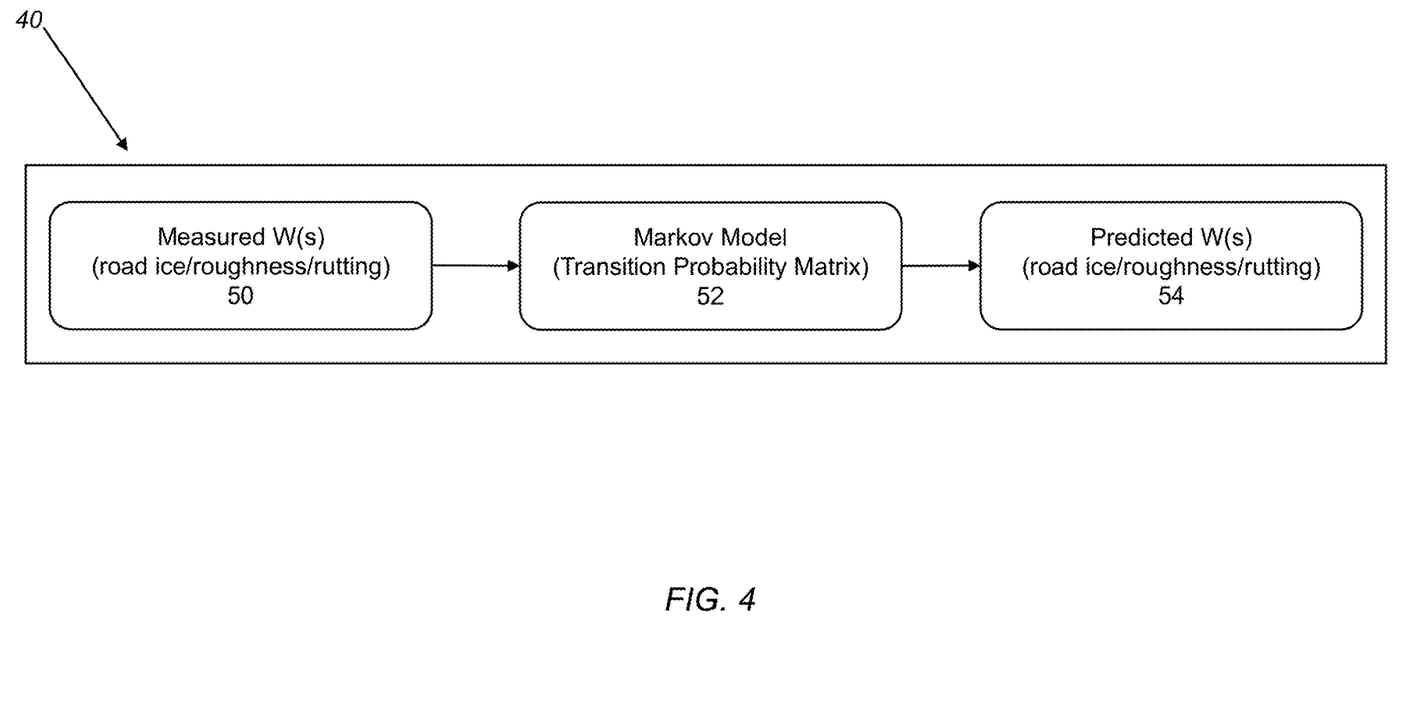
FIG. 4 is a flowchart illustrating a framework for estimating/predicting W(s), a vector of states corresponding to ice formation, road roughness, rutting state, etc. at a given location "s" indicative of RSC for each geographical location.

Related to the RFE/RSC inference update module 40, FIG. 4 illustrates a framework for estimating/predicting W(s), a vector of states corresponding to ice formation, road roughness, rutting state, etc. at a given location "s" indicative of RSC for each geographical location. In other words, $W(s)=f(Y(s), Y'(s)$ latitude(s), longitude(s), elevation(s), neighborhood location precipitation+wind speed), where $Y(s)$ is the observed temperature and $Y'(s)$ is the hourly temperature forecast. Neighborhood locations are identified as locations s', with geodesic distance from location "s" below a certain threshold value. The correlations between neighborhood precipitation and wind speed can be further utilized to predict RSC for location "s" varying with time, such that the impact reduces as a function of (s-s'), i.e., $F(s,s')=g(s-s')$. Here, function g could be a negative exponential or square weighted exponential function or the like to represent both fast and slow moving processes, respectively. Several periodic/aperiodic covariance-based functions can be used to model this function. Thus, W(s) indicates the predicted RSC for each road segment and can be updated continuously. W(s) can indicate dry, snow, slush, water, wet, and ice, along with predictions for ice formation (e.g., rain followed by an ambient temperature dipping below zero), road roughness state, road rutting state, etc. A Markov model or the like can then be trained to predict the transition for W(s) in the following time periods. In other words, weather changes can trigger prediction changes. This yields continuous predictions for ground and road conditions. The RCS predictions can be updated with additional information from vehicle sensors, vehicle cameras, static road cameras, and/or the like from time to time. FIG. 4 illustrates this measured W(s) (iced road/rutted road/rough road) 50, application of the Markov model/transition probability matrix 52, and resulting predicted W(s) (iced road/rutted road/rough road) 54.

The prior estimation of road surface conditions as taught herein may be provided as driver information, allowing for advanced route planning and enhanced safety. As dashboard display or mobile device can show predicted road friction/slipperiness over a given route in advance of a trip.

Thus, the present disclosure provides a system and method for utilizing AWD for deriving road surface condition RSC estimates. This system and method supplements RFEs made at the vehicle level with AWD in the cloud to form the RSC estimates, which are then transmitted to the vehicles such that more accurate RFEs can be made locally, and so on. Conventional RFE physics-based models are replaced with enhanced RFE trained ML models accordingly. Global RSC estimates are derived for each geographical region using weather and location constraints. Thus, improved autonomous driving and driver assist functions may be implemented, better driver warnings may be provided, and safer road trips may be planned in advance based on a thorough analysis of the drivable conditions.

The present disclosure provides a system and method that utilizes AWD to enable the accurate formulation of RFEs, and provides novel communication between vehicles using cloud-based information processing modules. Continuous RSC estimation is provided, delivering route slipperiness information to drivers for route and trip planning purposes. RFE and RSC parameters are combined for more accurate drivable surface monitoring, resulting in active safety improvements.

Preferably, the software applications of the present disclosure are each implemented as coded instructions stored in a memory and executed by a processor. The processor is a hardware device, such as a server, for executing such coded instructions. The processor can be any custom made or commercially available processor, a central processing unit (CPU), an auxiliary processor among several processors associated with the memory, a semiconductor-based microprocessor (in the form of a microchip or chip set), or generally any device for executing coded instructions. The processor is configured to execute software stored within the memory, to communicate data to and from the memory, and to generally control operations pursuant to the coded instructions. In an exemplary embodiment, the processor may include a mobile optimized processor, such as one optimized for power consumption and mobile applications. I/O interfaces can be used to receive user input and/or for providing system output. User input can be provided via, for example, a keypad, a touch screen, a scroll ball, a scroll bar, buttons, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include a graphical user interface (GUI) that enables a user to interact with the memory. Additionally, the I/O interfaces may further include an imaging device, i.e. camera, video camera, various sensors, etc.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality. The programs can include an application or "app" which provides various functionality.

Although the present disclosure is illustrated and described herein with reference to preferred embodiments, embodiment, and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A system for utilizing aggregated weather data (AWD) for deriving a road surface condition (RSC) estimate and a road friction estimate (RFE), comprising:
   a cloud subsystem operable for determining the RSC estimate for a geographical location using the AWD, updating the RSC estimate by formulating a measured vector of states corresponding to road condition for each geographical location, applying a transition probability matrix to the vector of states, and generating a predicted vector of states corresponding to road condition for each geographical location; and
   a vehicle subsystem in communication with the cloud subsystem operable for receiving the determined RSC estimate for the geographical location, combining the determined RSC estimate for the geographical location with one or more of local sensor data and local camera data.

2. The system of claim 1, wherein the vehicle subsystem is further operable for combining the determined RSC estimate for the geographical location with the one or more of the local sensor data and the local camera data in a trained machine learning (ML) model.

3. The system of claim 2, wherein the cloud subsystem is further operable for generating a training data set using the aggregated weather data that is transmitted to and used to train the trained ML model in the vehicle subsystem.

4. The system of claim 1, wherein the vehicle subsystem is further operable for determining the RFE based on the determined RSC estimate for the geographical location and the one or more of the local sensor data and the local camera data.

5. The system of claim 4, further comprising a communication link operable for transmitting the determined RFE to the cloud subsystem to revise the determined RSC estimate for the geographical location to form a revised determined RSC estimate for the geographical location.

6. The system of claim 4, wherein the determined RSC estimate for the geographical location is transmitted from the cloud subsystem to any vehicle subsystem actually or potentially passing through the geographical location such that a corresponding RFE based on the determined RSC estimate for the geographical location and one or more of corresponding local sensor data and corresponding local camera data can be determined using a corresponding trained ML model.

7. The system of claim 4, wherein the vehicle subsystem further comprises a vehicle control system operable for one or more of directing and modifying operation of the vehicle subsystem based on the determined RFE.

8. The system of claim 4, wherein the vehicle subsystem further comprises a vehicle control system operable for delivering a corresponding alert to a driver based on the determined RFE.

9. The system of claim 1, wherein the cloud subsystem is further operable for evaluating global RSC estimates for each geographical region using weather, weather forecast, or location constraints.

10. The system of claim 1, wherein the cloud subsystem is operable for tagging each geographical location with a predicted RSC estimate and transmitting a corresponding road condition indicator associated with each tagged geographical location along a route of interest to one or more of the vehicle subsystem and a mobile application.

11. The system of claim 10, wherein the one or more of the vehicle subsystem and the mobile application are operable for displaying the road condition indicator associated with each tagged geographical location along the route of interest to a user for route planning purposes.

12. A method for utilizing aggregated weather data (AWD) for deriving a road surface condition (RSC) estimate and a road friction estimate (RFE), comprising:
   in a cloud subsystem, determining the RSC estimate for a geographical location using the AWD, updating the RSC estimate by formulating a measured vector of states corresponding to road condition for each geographical location, applying a transition probability matrix to the vector of states, and generating a predicted vector of states corresponding to road condition for each geographical location; and in a vehicle subsystem in communication with the cloud subsystem, receiving the determined RSC estimate for the geographical location, combining the determined RSC estimate for the geographical location with one or more of local sensor data and local camera data.

13. The method of claim 12, further comprising, in the vehicle subsystem, combining the determined RSC estimate for the geographical location with the one or more of the local sensor data and the local camera data in a trained machine learning (ML) model.

14. The method of claim 13, further comprising, in the cloud subsystem, generating a training data set using the aggregated weather data that is transmitted to and used to train the trained ML model in the vehicle subsystem.

15. The method of claim 12 further comprising, in the vehicle subsystem, determining the RFE based on the determined RSC estimate for the geographical location and the one or more of the local sensor data and the local camera data.

16. The method of claim 15, further comprising, via a communication link, transmitting the determined RFE to the cloud subsystem to revise the determined RSC estimate for the geographical location to form a revised determined RSC estimate for the geographical location.

17. The method of claim 15, wherein the determined RSC estimate for the geographical location is transmitted from the cloud subsystem to any vehicle subsystem actually or potentially passing through the geographical location such that a corresponding RFE based on the determined RSC estimate for the geographical location and one or more of corresponding local sensor data and corresponding local camera data can be determined using a corresponding trained ML model.

18. The method of claim 15, wherein the vehicle subsystem further comprises a vehicle control system operable for one or more of directing and modifying operation of the vehicle subsystem based on the determined RFE.

19. The method of claim 15, wherein the vehicle subsystem further comprises a vehicle control system operable for delivering a corresponding alert to a driver based on the determined RFE.

20. The method of claim 12, further comprising, in the cloud subsystem, evaluating global RSC estimates for each geographical region using weather, weather forecast, or location constraints.

21. The method of claim 12, further comprising, in the cloud subsystem, tagging each geographical location with a predicted RSC estimate and transmitting a corresponding road condition indicator associated with each tagged geographical location along a route of interest to one or more of the vehicle subsystem and a mobile application.

22. The method of claim 21, further comprising, via one or more of the vehicle subsystem and the mobile application, displaying the road condition indicator associated with each tagged geographical location along the route of interest to a user for route planning purposes.

* * * * *